United States Patent
Baumgart et al.

(10) Patent No.: US 7,064,165 B2
(45) Date of Patent: Jun. 20, 2006

(54) COATING MATERIALS WHICH CAN BE CURED THERMALLY AND BY MEANS OF ACTING RADIATION, USE AND METHOD FOR THE PRODUCTION THEREOF

(75) Inventors: Hubert Baumgart, Münster (DE); Uwe Meisenburg, Duisburg (DE)

(73) Assignee: BASF Coatings AG, Munster (DE)

( * ) Notice: Subject to any disclaimer, the term of this patent is extended or adjusted under 35 U.S.C. 154(b) by 258 days.

(21) Appl. No.: 10/476,735

(22) PCT Filed: Jun. 18, 2002

(86) PCT No.: PCT/EP02/06679

§ 371 (c)(1),
(2), (4) Date: Nov. 3, 2003

(87) PCT Pub. No.: WO03/000812

PCT Pub. Date: Jan. 3, 2003

(65) Prior Publication Data

US 2004/0138389 A1    Jul. 15, 2004

(30) Foreign Application Priority Data

Jun. 21, 2001 (DE) ................. 101 29 970

(51) Int. Cl.
*C08G 18/04* (2006.01)
*C08G 18/06* (2006.01)
*C08L 75/00* (2006.01)

(52) U.S. Cl. ............. 525/127; 525/123; 525/124; 525/452; 528/44; 528/45; 528/67; 528/75

(58) Field of Classification Search ............ None
See application file for complete search history.

(56) References Cited

U.S. PATENT DOCUMENTS

| 3,396,063 | A | * | 8/1968 | Massoubre | ............... 156/307.5 |
| 3,396,083 | A |   | 8/1968 | Callow et al. | ............... 195/36 |
| 4,393,187 | A |   | 7/1983 | Boba et al. | ............... 528/60 |
| 5,264,497 | A | * | 11/1993 | Honig et al. | ............... 525/453 |
| 5,369,190 | A |   | 11/1994 | Hönig et al. | ............... 525/433 |
| 6,087,464 | A | * | 7/2000 | Swarup et al. | ............... 528/73 |
| 6,332,291 | B1 |   | 12/2001 | Flosbach et al. | ............... 52/91 |
| 6,462,139 | B1 |   | 10/2002 | Das et al. | |
| 6,512,026 | B1 |   | 1/2003 | Ott et al. | |
| 6,599,955 | B1 |   | 7/2003 | Weikard et al. | ............... 522/90 |
| 6,617,413 | B1 | * | 9/2003 | Bruchmann et al. | ............ 528/75 |
| 6,670,043 | B1 |   | 12/2003 | Barkac et al. | |
| 6,803,393 | B1 | * | 10/2004 | Blum et al. | ............... 522/107 |

FOREIGN PATENT DOCUMENTS

| CA | 2386222 | 4/2005 |
| DE | 1239043 | 1/1964 |
| DE | 10115605 | 10/2002 |
| EP | 476514 | 9/1991 |
| EP | 928800 | 12/1998 |
| EP | 1103572 | 11/2000 |
| WO | WO0123453 | 4/2001 |

OTHER PUBLICATIONS

Wilke. et al., U.S. Appl. No. 10/468,885, filed Feb. 8, 2003.
English Abstract for EP928800 from EPO, Jul. 14, 1999.

* cited by examiner

*Primary Examiner*—Jeffrey B. Robertson

(57) ABSTRACT

Coating materials curable thermally and with actinic radiation, comprising
(A) at least one binder containing isocyanate-reactive functional groups and
(B) a crosslinking component comprising
  (i) free and/or blocked isocyanate groups,
  (ii) reactive functional groups containing at least one bond which can be activated with actinic radiation,
  (iii) flexibilizing segments which as part of three-dimensional networks lower their glass transition temperature Tg, and
  (iv) hardening segments which as part of three-dimensional networks raise their glass transition temperature Tg;
with the proviso that the crosslinking component (B) comprises or consists of at least one constituent which has the features (i) and (ii);
processes for their preparation, and their use.

21 Claims, No Drawings

COATING MATERIALS WHICH CAN BE CURED THERMALLY AND BY MEANS OF ACTING RADIATION, USE AND METHOD FOR THE PRODUCTION THEREOF

CROSS REFERENCE TO RELATED APPLICATIONS

This application is a National Phase Application of Patent Application PCT1EP02/06679 filed on 18 Jun. 2002, which claims priority to DE 101 29 970.2, filed on 21 Jun. 2001.

The present invention relates to novel coating materials curable thermally and with actinic radiation. The present invention also relates to a novel process for preparing coating materials curable thermally and with actinic radiation. The present invention additionally relates to the use of the novel coating materials curable thermally and with actinic radiation in the fields of automotive OEN finishing, automotive refinish, the coating of buildings inside and out, the coating of furniture, windows or doors, and industrial coating, including coil coating, container coating, the impregnation or coating of electrical components, and the coating of white goods, including domestic appliances, boilers, and radiators.

In the context of the present invention, actinic radiation is electromagnetic radiation such as near infrared (NIR), visible light, UV radiation and X-rays or corpuscular radiation such as electron beams.

Coating materials, adhesives, and sealing compounds which can be cured both thermally and with actinic radiation (dual-cure coating materials, adhesives, and sealing compounds) are increasingly gaining in interest since they afford numerous advantages.

For instance, dual-cure coating materials on the one hand are better suited to the coating of thermally sensitive substrates than coating materials which are curable thermally only, since with the former materials any incomplete thermal cure at low temperatures may be compensated by the actinic radiation cure, so resulting overall in coatings having good performance properties. On the other hand, dual-cure coating materials are more suitable for the coating of three-dimensional substrates of complex shape than coating materials curable with actinic radiation only, since an incomplete radiation cure in the shadow regions of the substrates may be compensated by the thermal cure, so here again leading overall to coatings having good performance properties.

The same applies, mutatis mutandis, to the dual-cure adhesives and dual-cure sealing compounds as well.

Dual-cure coating materials are known from the German patent application DE 198 18 735 A1. The dual-cure coating materials include constituents, such as (meth)acrylate copolymers, which besides isocyanate-reactive functional groups mandatorily contain (meth)acryloyl groups, and constituents, such as (meth)acrylate copolymers, which besides complementary free isocyanate groups likewise mandatorily contain (meth)acryloyl groups. Furthermore, they may comprise thermally curable constituents, such as (meth)acrylate copolymers, which are free from (meth)acryloyl groups but contain isocyanate-reactive groups. Over and above this, the German patent application describes a large number of alternatives to these components, which are all said to be of equal effect.

It is in fact stated that the known dual-cure coating materials give coatings having very good chemical, gasoline and solvent resistance, high scratch resistance, and also good and rapid sandability, and in this respect satisfy the requirements imposed on a multicoat paint system in the field of automotive finishing, especially automotive refinish. Moreover, the coatings are said to be free from cracking and to exhibit good substrate adhesion. Overall, they are said to have an excellent visual appearance. However, neither the description nor any example provides specifics as to how this profile of properties can be set and optimized in detail and which of the practically innumerable alternatives, which can be inferred from a plurality of lists, are the ones which function best.

The European patent application EP 0 928 800 A1 discloses a dual-cure coating material which comprises a urethane (meth)acrylate containing free isocyanate groups and (meth)acryloyl groups, a photoinitiator and an isocyanate-reactive compound, in particular a polyol or polyamine. Specifically, a urethane (meth)acrylate based on a trimer of hexamethylene diisocyanate is described.

The dual-cure coating materials known to date provide coatings which exhibit high scratch resistance. Their etch resistance, i.e., their resistance to acid rain, their weathering stability and chemical resistance, however, still leave something to be desired. If customary and known measures to improve these properties are taken, the scratch resistance of the coatings is reduced.

The German patent application DE 101 15 6 05.7, unpublished at the priority date of the present specification, describes powder slurries which are curable thermally and with actinic radiation and which comprise solid and/or highly viscous particles which are dimensionally stable under storage and application conditions. The dimensionally stable particles comprise (A) a binder which is free from carbon-carbon double bonds which can be activated with actinic radiation, comprising at least one (meth)acrylate copolymer containing on average per molecule at least one isocyanate-reactive functional group and at least one ion-forming group, (B) at least one blocked and/or part blocked polyisocyanate, and (C) at least one olefinically unsaturated constituent which is free from isocyanate-reactive functional groups and contains on average per molecule more than four carbon-carbon double bonds which can be activated with actinic radiation.

It is preferred to employ polyisocyanates (B) which include at least one flexibilizing segment in the molecule, which as a constituent of three-dimensional networks lowers their glass transition temperature Tg.

It is preferred to employ olefinically unsaturated constituents (C) which include in the molecule at least one hardening segment, which as a constituent of three-dimensional networks raises their glass transition temperature Tg.

It is an object of the present invention to provide novel coating materials curable thermally and with actinic radiation which provide coatings combining a high scratch resistance with high etch resistance, chemical resistance, and weathering stability. At the same time the novel coating materials curable thermally and with actinic radiation should be easy to prepare and simple to apply. Moreover, the novel coating materials curable thermally and with actinic radiation should be susceptible of broad application.

The invention accordingly provides the novel coating materials curable thermally and with actinic radiation, comprising (A) at least one binder containing isocyanate-reactive functional groups and (B) a crosslinking component comprising (i) free and/or blocked isocyanate groups, (ii) reactive functional groups containing at least one bond which can be activated with actinic radiation,
(iii) flexibilizing segments which as part of three-dimensional networks lower their glass transition temperature Tg, and
(iv) hardening segments which as part of three-dimensional networks raise their glass transition temperature Tg;
with the proviso that the crosslinking component (B) comprises at least one constituent which has the features (i) and (ii).

In the text below the novel coating material curable thermally and with actinic radiation are referred to as "coating materials of the invention".

Further subject matter of the invention will emerge from the description.

In the light of the prior art it was surprising and unforeseeable for the skilled worker that the object on which the present invention was based could be achieved with the aid of the coating materials of the invention. Particularly surprising was the fact that, through the use of the crosslinking component (B), it was possible to close the gap between the etch resistance and the scratch resistance in the coatings of the invention. Even more surprising was the broad applicability of the coating materials of the invention, which could also be used as adhesives and sealing compounds to produce adhesive films and seals.

The first essential constituent of the coating materials of the invention is at least one binder (A) containing on average per molecule at least one, preferably at least two, and in particular at least three, isocyanate-reactive functional group(s).

Examples of suitable isocyanate-reactive functional groups are hydroxyl, thiol, and primary and secondary amino groups, especially hydroxyl groups.

The binder (A) may further include at least one, in particular at least two, of the reactive functional groups described below, containing at least one bond which can be activated with actinic radiation.

Examples of suitable binders (A) are random, alternating and/or block, linear and/or branched and/or comb addition (co)polymers of ethylenically unsaturated monomers, polyaddition resins and/or polycondensation resins, curable thermally or both thermally and with actinic radiation. For further details of these terms, refer to Römpp Lexikon Lacke und Druckfarben, Georg Thieme Verlag, Stuttgart, New York, 1998, page 457, "polyaddition" and "polyaddition resins (polyadducts)", and also pages 463 and 464, "polycondensates", "polycondensation", and "polycondensation resins", and also pages 73 and 74, "binders".

Examples of suitable addition (co)polymers (A) are (meth)acrylate (co)polymers or partially saponified polyvinyl esters, especially (meth)acrylate copolymers.

Examples of suitable polyaddition resins and/or polycondensation resins (A) are polyesters, alkyds, polyurethanes, polylactones, polycarbonates, polyethers, epoxy resin-amine adducts, polyureas, polyamides, polyimides, polyester-polyurethanes, polyether-polyurethanes or polyester-polyether-polyurethanes, especially polyesters.

Of these binders (A), the (meth)acrylate copolymers and the polyesters have particular advantages and are therefore used with particular preference.

Examples of Suitable Olefinically Unsaturated Monomers (a) for preparing the (meth)acrylate copolymers (A) are
(a1) monomers which carry at least one hydroxyl or amino group per molecule, such as
hydroxyalkyl esters of acrylic acid, methacrylic acid or another alpha,beta-olefinically unsaturated carboxylic acid, which are derived from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as epsilon-caprolactone and these hydroxyalkyl or hydroxycycloalkyl esters;
olefinically unsaturated alcohols such as allyl alcohol;
polyols such as trimethylolpropane monoallyl or diallyl ether or pentaerythritol monoallyl, diallyl or triallyl ether;
reaction products of acrylic acid and/or methacrylic acid with the glycidyl ester of an alpha-branched monocarboxylic acid having 5 to 18 carbon atoms per molecule, especially a Versatic® acid, or instead of the reaction product an equivalent amount of acrylic and/or methacrylic acid, which is then reacted during or after the polymerization reaction with the glycidyl ester of an alpha-branched mono-carboxylic acid having 5 to 18 carbon atoms per molecule, especially a Versatic® acid;
aminoethyl acrylate, aminoethyl methacrylate, allylamine or N-methyliminoethyl acrylate; and/or
acryloyloxysilane-containing vinyl monomers, preparable by reacting hydroxy-functional silanes with epichlorohydrin and then reacting that reaction product with (meth)acrylic acid and/or hydroxyalkyl esters and/or hydroxycycloalkyl esters of (meth)acrylic acid and/or other hydroxyl-containing monomers (a1).
(a2) Monomers which carry at least one acid group per molecule, such as
acrylic acid, beta-carboxyethyl acrylate methacrylic acid, ethacrylic acid, crotonic acid, maleic acid, fumaric acid or itaconic acid;
olefinically unsaturated sulfonic or phosphonic acids or their partial esters;
mono(meth)acryloyloxyethyl maleate, succinate or phthalate; or
vinylbenzoic acid (all isomers), alpha-methylvinylbenzoic acid (all isomers) or vinylbenzenesulfonic acid (all isomers).
(a3) Monomers which are substantially or entirely free from reactive functional groups, such as:
Monomers (a31):
(Meth)acrylic esters which are substantially free from acid groups, such as (meth)acrylic alkyl or cycloalkyl esters having up to 20 carbon atoms in the alkyl radical, especially methyl, ethyl, n-propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-indenemethanol or tert-butylcyclohexyl (meth)acrylate; (meth)acrylic oxaalkyl or oxacycloalkyl esters such as ethoxytriglycol (meth) acrylate and methoxyoligoglycol (meth)acrylate having a molecular weight Mn of preferably 550 or other ethoxylated and/or propoxylated, hydroxyl-free (meth) acrylic acid derivatives (further examples of suitable monomers (31) of this kind are known from the laid-open specification DE 196 25 773 A1, column 3, line 65 to column 4, line 20). In minor amounts they may contain higher-functional (meth)acrylic alkyl or cycloalkyl esters such as ethylene glycol, propylene glycol, diethylene glycol, dipropylene glycol, butylene glycol, 1,5-pentanediol, 1,6-hexanediol, octahydro-4,7-methano-1H-indenedimethanol or cyclohexane-1,2-, -1,3- or -1,4-diol di(meth)acrylate; trimethylol-propane di- or tri(meth)acrylate; or pentaerythritol di-, tri- or tetra(meth)acrylate. In the context of the present invention, minor amounts of higher-functional monomers (a31) are amounts which do not lead to crosslinking or gelling of the copolymers, unless the intention is that they should be in the form of crosslinked microgel particles.

Monomers (a32):

Vinyl esters of alpha-branched monocarboxylic acids having 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise branched and straight-chain acyclic and/or cycloaliphatic olefins. The reaction of such olefins with formic acid or with carbon monoxide and water produces a mixture of carboxylic acids in which the carboxyl groups are located predominantly on a quaternary carbon atom. Other olefinic starting materials are, for example, propylene trimer, propylene tetramer and diisobutylene. Alternatively, the vinyl esters may be prepared in a conventional manner from the acids; for example, by reacting the acid with acetylene. Particular preference, owing to their ready availability, is given to the use of vinyl esters of saturated aliphatic monocarboxylic acids having 9 to 11 carbon atoms which are branched on the alpha carbon atom. Vinyl esters of this kind are sold under the brand name VeoVa® (cf. also Römpp, op. cit., page 598).

Monomers (a33):

Diarylethylenes, especially those of the general formula I:

$$R^1R^2C=CR^3R^4 \qquad (I),$$

in which the radicals $R^1$, $R^2$, $R^3$ and $R^4$ in each case independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals. Examples of suitable alkyl radicals are methyl, ethyl, propyl, isopropyl, n-butyl, isobutyl, tert-butyl, amyl, hexyl or 2-ethylhexyl. Examples of suitable cycloalkyl radicals are cyclobutyl, cyclopentyl or cyclohexyl. Examples of suitable alkylcycloalkyl radicals are methylenecyclohexane, ethylenecyclohexane or propane-1,3-diylcyclohexane. Examples of suitable cycloalkylalkyl radicals are 2-, 3- or 4-methyl-, -ethyl-, -propyl- or -butylcyclohex-1-yl. Examples of suitable aryl radicals are phenyl, naphthyl or biphenylyl, preferably phenyl and naphthyl and especially phenyl. Examples of suitable alkyl aryl radicals are benzyl or ethylene- or propane-1,3-diyl-benzene. Examples of suitable cycloalkylaryl radicals are 2-, 3- or 4-phenylcyclohex-1-yl. Examples of suitable arylalkyl radicals are 2-, 3- or 4-methyl-, -ethyl-, -propyl- or -butylphen-1-yl. Examples of suitable arylcycloalkyl radicals are 2-, 3- or 4-cyclohexylphen-1-yl. The aryl radicals $R^1$, $R^2$, $R^3$ and/or $R^4$ are preferably phenyl or naphthyl radicals, especially phenyl radicals. The substituents that may be present in the radicals $R^1$, $R^2$, $R^3$ and/or $R^4$ are electron-withdrawing or electron-donating atoms or organic radicals, especially halogen atoms, nitrile, nitro, partially or fully halogenated alkyl, cycloalkyl, alkylcycloalkyl, cycloalkylalkyl, aryl, alkylaryl, cycloalkylaryl, arylalkyl and arylcycloalkyl radicals; aryloxy, alkyloxy and cycloalkyloxy radicals; and/or arylthio, alkylthio and cycloalkylthio radicals. Diphenylethylene, dinaphthaleneethylene, cis- or trans-stilbene or vinylidene-bis(4-nitrobenzene), especially diphenylethylene (DPE), are particularly advantageous and so are used with preference. In the context of the present invention, the monomers (a33) are used in order to regulate the copolymerization advantageously such that batchwise free-radical copolymerization is also possible.

Monomers (a34):

Vinylaromatic hydrocarbons such as styrene, vinyl toluene, diphenylethylene or alpha-alkylstyrenes, especially alpha-methylstyrene.

Monomers (a35):

Nitriles such as acrylonitrile and/or methacrylonitrile;

Monomers (a36):

Vinyl compounds, especially vinyl halides and/or vinylidene dihalides, such as vinyl chloride, vinyl fluoride, vinylidene dichloride or vinylidene difluoride; N-vinyl amides such as vinyl-N-methylformamide, N-vinylcaprolactam or N-vinyl-pyrrolidone; 1-vinylimidazole; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethylheptanoic acid.

Monomers (a37):

Allyl compounds, especially allyl ethers and allyl esters such as allyl methyl, ethyl, propyl or butyl ether or allyl acetate, propionate or butyrate.

Monomers (a38):

Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000, and in particular from 3000 to 7000 and having on average from 0.5 to 2.5, preferably from 0.5 to 1.5, ethylenically unsaturated double bonds per molecule, as are described in DE 38 07 571 A1 on pages 5 to 7, in DE 37 06 095 A1 in columns 3 to 7, in EP 0 358 153 B1 on pages 3 to 6, in U.S. Pat. No. 4,754,014 A1 in columns 5 to 9, in DE 44 21 823 A1 or in the international patent application WO 92/22615 on page 12, line 18 to page 18, line 10.

Monomers (a39):
Olefins such as ethylene, propylene, but-1ene, pent-1-ene, hex-1ene, cyclohexene, cyclopentene, norbornene, butadiene, isoprene, cyclopentadiene and/or dicyclopentadiene.

(a4) Monomers containing epoxide groups, such as the glycidyl ester of acrylic acid, methacrylic acid, ethacrylic acid, crotonic acid, maleic acid, fumaric acid or itaconic acid or allyl glycidyl ether.

Higher-functional monomers of the type described above are generally used in minor amounts. In the context of the present invention, minor amounts of higher-functional monomers are amounts which do not lead to crosslinking or gelling of the (meth)acrylate copolymers (A), unless the specific intention is to produce crosslinked polymeric microparticles.

Depending on the intended use of the coating material of the invention, the (meth)acrylate copolymers (A) have a glass transition temperature of from −50° C. to +110, preferably from −30° to +80, more preferably from −15 to +70, with particular preference from −15 to +50, with very particular preference from −15 to +40, and in particular from −15 to +30° C. Their acid number is guided in particular by whether they are to be used in aqueous coating materials of the invention; preferably, the acid number is from 5 to 100 mg KOH/g. Similarly, the amount of isocyanate-reactive groups they contain, especially hydroxyl groups, may vary widely. Preferably, their hydroxyl number is from 20 to 300, more preferably from 30 to 250, with particular preference from 40 to 200, with very particular preference from 60 to 190, and in particular from 80 to 180, mg KOH/g. Particular advantages result from the use of the (a2) monomers 2-hydroxypropyl, 3-hydroxypropyl, 3-hydroxybutyl and 4-hydroxybutyl acrylate and methacrylate.

Examples of suitable preparation processes for (meth) acrylate copolymers (A) are described in the European patent application EP 0 767 185 A1, in the German patents DE 22 14 650 B1 and DE 27 49 576 B1 and in the American patents U.S. Pat. No. 4,091,048 A1, U.S. Pat. No. 3,781,379 A1, U.S. Pat. No. 5,480,493 A1, U.S. Pat. No. 5,475,073 A1 and U.S. Pat. No. 5,534,598 A1, or in the standard work Houben-Weyl, Methoden der organischen Chemie, 4th edition, volume 14/1, pages 24 to 255, 1961. Suitable reactors for the copolymerization include the customary and known stirred tanks, stirred tank cascades, tube reactors, loop reactors or Taylor reactors, such as are described, for example, in the patents and patent applications DE 1 071 241 B1, EP 0 498 583 A1, and DE 198 28 742 A1, or in the article by K. Kataoka in Chemical Engineering Science, volume 50, number 9, 1995, pages 1409 to 1416.

Examples of suitable polyesters are, in particular, aliphatic polyesters based on hexahydrophthalic anhydride. The polyesters are commercially customary products and are sold, for example, under the brand name Desmophen® 2089, A 575 and 670 by Bayer AG.

The preparation of such polyesters is described, for example, in the standard work Ullmanns Encyklopädie der technischen Chemie, 3rd edition, volume 14, Urban & Schwarzenberg, Munich, Berlin, 1963, pages 80 to 89 and pages 99 to 105, and also in the books "Résines Alkydes-Polyesters" by J. Bourry, Dunod, Paris, 1952, "Alkyd Resins" by C. R. Martens, Reinhold Publishing Corporation, New York, 1961, and "Alkyd Resin Technology" by T. C. Patton, Interscience Publishers, 1962.

The introduction of reactive functional groups containing at least one bond which can be activated by actinic radiation may be effected, for example, by polymer-analogous reaction of the above-described (meth)acrylate copolymers (A) with appropriate compounds which contain bonds which can be activated by actinic radiation. By way of example, any lateral glycidyl groups of the (meth)acrylate copolymers (A) may be reacted with (meth)acrylic acid. Or it is possible to react some of the hydroxyl groups with compounds which contain one free isocyanate group and at least one, especially one, bond which can be activated with actinic radiation. Examples of suitable compounds of this kind are 1-(1-isocyanato-1-methylethyl)-3-(1-methylethenyl)benzene (TMI® from Cytec) and vinyl isocyanate.

The amount of the binders (A) in the coating materials of the invention may vary widely and is guided primarily with the functionality of the binders (A) on the one hand and of the crosslinking agents (B) on the other. Preferably the amount, based on the solids of a coating material of the invention, is from 20 to 90, more preferably from 25 to 85, with particular preference from 30 to 80, with very particular preference from 35 to 75, and in particular from 40 to 70% by weight.

The further essential constituent of coating materials of the invention is the crosslinking component (B).

The crosslinking component (B) for use in accordance with the invention may be of arbitrary composition, provided only that it comprises (i) free and/or blocked isocyanate groups,
(ii) reactive functional groups containing at least one bond which can be activated with actinic radiation,
(iii) flexibilizing segments which as part of three-dimensional networks lower their glass transition temperature Tg, and
(iv) hardening segments which as part of three-dimensional networks raise their glass transition temperature Tg;

with the proviso that the crosslinking component (B) comprises at least one constituent which has the features (i) and (ii).

In addition, the crosslinking component (B) may include customary and known polyisocyanates which contain no reactive functional groups having at least one bond which can be activated with actinic radiation.

In a first preferred embodiment the crosslinking component (B) comprises (B1) at least one, especially one, constituent containing on average per molecule
  (i) at least one, in particular at least two, free and/or at least one, in particular at least two, blocked isocyanate group(s),
  (ii) at least one, in particular at least two, reactive functional group(s) containing at least one, in particular one, bond which can be activated with actinic radiation, and
  (iii) at least one flexibilizing segment, preferably at least two and in particular at least three flexibilizing segments, which as part of three-dimensional networks lower their glass transition temperature Tg; and (B2) at least one, especially one, constituent containing on average per molecule
  (i) at least one, in particular at least two, free and/or at least one, in particular at least two, blocked isocyanate group(s),
  (ii) at least one, in particular at least two, reactive functional group(s) containing at least one, in particular one, bond which can be activated with actinic radiation, and
  (iv) at least one hardening segment, preferably at least two and in particular at least three hardening segments, which as part of three-dimensional networks raise their glass transition temperature Tg;

or it consists thereof. Accordingly, in the case of this preferred embodiment, the two constituents or crosslinking agents (B1) and (B2) are prepared separately from one another and are combined to give the crosslinking component (B) only at the stage of the preparation of the coating material of the invention.

In accordance with another preferred embodiment, the crosslinking component (B) comprises at least two constituents preparable by the single-stage or multistage, particularly single-stage, reaction 1.) of a mixture comprising
- 1.1) at least one, especially one, polyisocyanate containing on average per molecule at least two, in particular at least three, free isocyanate groups, or at least two, in particular at least three, free and at least one, in particular at least two, blocked isocyanate group(s) and also at least one flexibilizing segment, preferably at least two and in particular at least three flexibilizing segments, which as part of three-dimensional networks lower their glass transition temperature Tg; and
- 1.2) at least one, especially one, polyisocyanate containing on average per molecule at least two, in particular at least three, free isocyanate groups, or at least two, in particular at least three, free and at least one, in particular at least two, blocked isocyanate group(s) and also at least one hardening segment, preferably at least two and in particular at least three hardening segments, which as part of three-dimensional networks raise their glass transition temperature Tg; with 2.) at least one, especially one, compound containing on average per molecule at least one, especially one, isocyanate-reactive functional group and at least one, especially one, reactive functional group having at least one bond which can be activated with actinic radiation;

or it consists of these constituents.

Accordingly, in the case of this preferred embodiment, crosslinking agents (B1) and (B2) are not prepared and then combined to give the crosslinking component (B); instead, the starting point is a mixture 1.) of polyisocyanates 1.1) and 1.2) which are then reacted with the compound 2.) in a one-part process to give the crosslinking component (B), without any isolation of defined products.

In accordance with a third preferred embodiment, the combination of flexibilizing and hardening segments, which is essential to the invention, may also be introduced into the crosslinking components (B) by way of compounds 1.3) or 1.4).

The compounds 1.3) contain on average per molecule at least two, especially two, isocyanate-reactive functional groups and at least one, especially one, hardening segment which as part of three-dimensional networks raises their glass transition temperature Tg.

In this case, the co-reactants to the compounds 1.3) are the polyisocyanates 1.1).

The compounds 1.4) contain on average per molecule at least two, especially two, isocyanate-reactive functional groups and at least one, especially one, flexibilizing segment which as part of three-dimensional networks lowers their glass transition temperature Tg.

In this case, the co-reactants to the compounds 1.4) are the polyisocyanates 1.2).

The compounds 1.3) are reacted with the polyisocyanates 1.1), and the compounds 1.4) with the polyisocyanates 1.2), in an equivalents ratio of isocyanate-reactive functional groups to free isocyanate groups such that in the resulting precursor 3.) there are still on average per molecule at least two, in particular at least three, free isocyanate groups or at least two, in particular at least three, free isocyanate groups and at least one, in particular two, blocked isocyanate group(s).

The precursor 3.) may, however, also be prepared, observing the conditions referred to above, by the reaction of the following co-reactants:

1.1)+[1.3)+1.4)], 1.2)+[1.4)+1.3)],

[1.1)+1.2)]+1.3),

[1.1)+1.2)]+1.4) and

[1.1)+1.2)]+[1.3)+1.4)].

In a further stage, the precursors 3.) are reacted with the compounds 2.) in an equivalents ratio of isocyanate-reactive functional groups to free isocyanate groups such that the resulting constituents of the crosslinking components (B) have the features (i), (ii), (iii) and (iv) that are essential to the invention. The crosslinking components (B) may comprise or consist of these constituents.

Where the coating materials of the invention are two-component or multicomponent systems, the crosslinking components (B) mandatorily contain free isocyanate groups. In addition, they may also contain blocked isocyanate groups.

Where the coating materials of the invention are one-component systems, the crosslinking components (B) predominantly or exclusively contain blocked isocyanate groups.

Suitable blocking agents for the isocyanate groups are all customary and known blocking agents. The blocking agents are preferably selected from the group consisting of phenols, such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

lactams, such as ε-caprolactam, δ-valerolactam, γ-butyrolactam or β-propiolactam;

active methylenic compounds, such as diethyl malonate, dimethyl malonate, ethyl or methyl acetoacetate or acetylacetone;

alcohols, such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

mercaptans, such as butyl mercaptan, hexyl mercaptan, t-butyl mercaptan, t-dodecyl mercaptan, 2-mercaptobenzothiazole, thiophenol, methylthio-phenol or ethylthiophenol;

acid amides, such as acetoanilide, acetoanisidinamide, acrylamide, methacrylamide, acetamide, stearamide or benzamide;

imides, such as succinimide, phthalimide or maleimide;
amines, such as diphenylamine, phenylnaphthylamine, xylidine, N-phenylxylidine, carbazole, aniline, naphthylamine, butylamine, dibutylamine or butylphenylamine;
imidazoles, such as imidazole or 2-ethylimidazole;
ureas, such as urea, thiourea, ethyleneurea, ethylenethiourea or 1,3-diphenylurea;
carbamates, such as phenyl N-phenylcarbamate or 2-oxazolidone;
imines, such as ethyleneimine;
oximes, such as acetone oxime, formaldoxime, acetaldoxime, acetoxime, methyl ethyl ketoxime, diisobutyl ketoxime, diacetyl monoxime, benzophenone oxime or chlorohexanone oximes;
salts of sulfurous acid, such as sodium bisulfite or potassium bisulfite;
hydroxamic esters, such as benzyl methacrylohydroxamate (BMH) or allyl methacrylohydroxamate; or
substituted pyrazoles, especially dimethylpyrazole or triazoles; and also
mixtures of these blocking agents.

The mixtures have particular advantages and so are used with preference. Particular preference is given to the mixtures of malonates and acetoacetates and also dimethylpyrazoles and succinimides.

The crosslinking components (B) contain reactive functional groups having at least one bond which can be activated with actinic radiation.

Examples of suitable bonds which can be activated with actinic radiation are carbon-hydrogen single bonds or carbon-carbon, carbon-oxygen, carbon-nitrogen, carbon-phosphorus or carbon-silicon single bonds or double bonds. Of these, the double bonds, especially the carbon-carbon double bonds (referred to below as "double bonds"), are employed with preference.

Highly suitable double bonds are present, for example, in (meth)acrylate, ethacrylate, crotonate, cinnamate, vinyl ether, vinyl ester, ethenylarylene, dicyclopentadienyl, norbornenyl, isoprenyl, isopropenyl, allyl or butenyl groups; ethenylarylene ether, dicyclopentadienyl ether, norbornenyl ether, isoprenyl ether, isopropenyl ether, allyl ether or butenyl ether groups; or ethenylarylene ester, dicyclopentadienyl ester, norbornenyl ester, isoprenyl ester, isopropenyl ester, allyl ester or butenyl ester groups. Of these, (meth)acrylate groups, especially acrylate groups, are of particular advantage and are therefore used with very particular preference in accordance with the invention.

Suitable compounds 2.) by means of which the above-described reactive functional groups having at least one bond which can be activated with actinic radiation may be introduced into the crosslinking components (B) contain per molecule at least one, especially one, isocyanate-reactive functional group and also at least one, especially one, bond which can be activated with actinic radiation. Examples of suitable compounds of this kind are
allyl alcohol or 4-butyl vinyl ether;
hydroxyalkyl esters and hydroxycycloalkyl esters of acrylic acid or of methacrylic acid, especially of acrylic acid, which are obtainable by esterifying aliphatic diols, examples being the low molecular mass diols B) described above, with acrylic acid or methacrylic acid or by reacting acrylic acid or methacrylic acid with an alkylene oxide, especially hydroxyalkyl esters of acrylic acid or methacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl or bis(hydroxymethyl)cyclohexane acrylate or methacrylate; of these, 2-hydroxyethylacrylate and 4-hydroxybutyl acrylate are particularly advantageous and are therefore used with particular preference in accordance with the invention; or
reaction products of cyclic esters, such as epsilon-caprolactone, for example, and these hydroxyalkyl or hydroxycycloalkyl esters.

The crosslinking component (B) or its above-described starting products comprise the flexibilizing segments which as part of the three-dimensional networks lower their glass transition temperature Tg.

The flexibilizing segments are preferably divalent organic radicals. Preferably, the flexibilizing segments are selected from the group consisting of divalent aliphatic hydrocarbon radicals and divalent, heteroatom-containing aliphatic hydrocarbon radicals.

Examples of suitable flexibilizing, divalent organic radicals of this kind are substituted or unsubstituted, preferably unsubstituted, linear or branched, preferably linear, alkanediyl radicals having from 4 to 30, preferably 5 to 20, and in particular 6, carbon atoms, which within the carbon chain may also contain cyclic groups, provided the carbon chains between the isocyanate groups and the cyclic groups contain in each case more than two carbon atoms.

Examples of highly suitable linear alkanediyl radicals are tetramethylene, pentamethylene, hexamethylene, heptamethylene, octamethylene, nonane-1,9-diyl, decane-1,10-diyl, undecane-1,11-diyl, dodecane-1,12-diyl, tridecane-1,13-diyl, tetradecane-1,14-diyl, pentadecane-1,15-diyl, hexadecane-1,16-diyl, heptadecane-1,17-diyl, octadecane-1,18-diyl, nonadecane-1,19-diyl or eicosane-1,20-diyl, preferably tetramethylene, pentamethylene, hexamethylene, heptamethylene, octamethylene, nonane-1,9-diyl, decane-1,10-diyl, especially hexamethylene.

Examples of highly suitable alkanediyl radicals which also contain cyclic groups in the carbon chain are 2-heptyl-1-pentylcyclohexane-3,4-bis(non-9-yl), cyclohexane-1,2-, -1,4- or -1,3-bis(eth-2-yl), cyclohexane-1,3-bis(prop-3-yl) or cyclohexane-1,2-, -1,4- or -1,3-bis(but-4-yl).

Further examples of suitable divalent organic radicals which contain heteroatoms are divalent polyester radicals comprising repeating polyester units of the formula —(—CO—(CHR$^5$)$_m$—CH$_2$—O—)—. In this formula the index m is preferably from 4 to 6 and the substituent R$^5$ is hydrogen or an alkyl, cycloalkyl or alkoxy radical. No one substituent contains more than 12 carbon atoms.

Further examples of suitable divalent organic radicals which contain heteroatoms are divalent linear polyether radicals, preferably having a number average molecular weight of from 400 to 5000, in particular from 400 to 3000. Highly suitable polyether radicals have the general formula —(—O—(CHR$^6$)$_o$—)$_p$O—, where the substituent R$^6$ is hydrogen or a lower, unsubstituted or substituted alkyl radical, the index o is from 2 to 6, preferably from 3 to 4, and the index p is from 2 to 100, preferably from 5 to 50. Especially suitable examples are linear or branched polyether radicals derived from poly(oxyethylene) glycols, poly (oxypropylene) glycols and poly(oxybutylene) glycols.

Also suitable, furthermore, are linear divalent siloxane radicals, as present, for example, in silicone rubbers; hydrogenated polybutadiene or polyisoprene radicals, random or alternating butadiene-isoprene copolymer radicals or butadiene-isoprene graft copolymer radicals, which may also contain styrene in copolymerized form, and also ethylene-propylene-diene radicals.

Suitable substituents include all organic functional groups that are substantially inert, i.e., which do not undergo reactions with constituents of the coating materials of the invention.

Examples of suitable inert organic radicals are alkyl groups, especially methyl groups, halogen atoms, nitro groups, nitrile groups or alkoxy groups.

Of the above-described divalent organic radicals, the alkanediyl radicals containing no substituents and no cyclic groups in the carbon chain are of advantage and are therefore used with preference.

Crosslinking agents (B1) or some of the crosslinking components (B) are appropriately prepared from polyisocyanates 1.1). These may contain identical or different flexibilizing segments. They preferably contain flexibilizing segments of the same kind.

The polyisocyanates 1.1) preferably have an isocyanate functionality >2, more preferably >2.5, with particular preference >2.7, and in particular >2.9. The upper limit of the isocyanate functionality is preferably 10, more preferably 8, with very particular preference 6, and in particular 5.

Examples of suitable polyisocyanates 1.1) are the oligomers of diisocyanates; such as trimethylene diisocyanate, tetramethylene diisocyanate, pentamethylene diisocyanate, hexamethylene diisocyanate, heptamethylene diisocyanate, ethylethylene diisocyanate, trimethylhexane diisocyanate or acyclic aliphatic diisocyanates containing cyclic groups in their carbon chain, such as diisocyanates derived from dimerfatty acids, as sold under the commercial designation DDI 1410 by Henkel and described in the patents WO 97/49745 and WO 97/49747, especially 2-heptyl-3,4-bis(9-isocyanatononyl)-1-pentylcyclohexane, or 1,2-, 1,4- or 1,3-bis(2-isocyanatoeth-1-yl)cyclohexane, 1,3-bis(3-isocyanatoprop-1-yl)cyclohexane or 1,2–, 1,4- or 1,3-bis(4-isocyanatobut-1-yl)cyclohexane. In the context of the present invention, owing to their two isocyanate groups attached exclusively to alkyl groups and despite their cyclic groups, the latter are included among the acyclic aliphatic diisocyanates. Of these diisocyanates, hexamethylene diisocyanate is used with particular preference.

It is preferred to use oligomers 1.1) that contain isocyanurate, urea, urethane, biuret, uretdione, iminooxadiazinedione, carbodiimide and/or allophanate groups. Examples of suitable preparation processes are known from the patents CA 2,163,591 A, U.S. Pat. No. 4,419,513 A, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1 and EP 0 531 820 A1 or are described in the German patent application DE 100 05 228.2, unpublished at the priority date of the present specification.

Also suitable as polyisocyanate 1.1) is nonyl triisocyanate (NTI).

The crosslinking components (B) or the crosslinking agent (B2) contain the hardening segments which as part of three-dimensional networks raise their glass transition temperature Tg.

The hardening segments are divalent or higher polyvalent organic radicals. Preference is given to using divalent organic radicals. In addition, minor amounts of higher polyvalent, especially trivalent, organic radicals may be used, by means of which it is possible to influence the crosslinking density.

Examples of highly suitable hardening segments are divalent aromatic, cycloaliphatic and aromatic-cycloaliphatic radicals, in which within the crosslinking agents (B2) and in the polyisocyanates 1.2) at least one linking bond leads directly to the cycloaliphatic and/or aromatic structural unit, and also divalent aliphatic radicals in which within the crosslinking agents (B2) and in the polyisocyanates 1.2) the two linking bonds lead to methylene groups which are connected to an aromatic or cycloaliphatic, especially cycloaliphatic, structural unit.

The divalent cycloaliphatic, aromatic and aliphatic radicals, especially the cycloaliphatic radicals, are advantageous and are used with preference.

Examples of suitable divalent aromatic radicals are substituted, especially methyl-substituted, or unsubstituted aromatic radicals having from 6 to 30 carbon atoms in the molecule, such as phen-1,4-, 1,3- or 1,2-ylene, naphth-1,4-, -1,3-, -1,2-, -1,5- or -2,5-ylene, propane-2,2-di(phen-4'-yl), methane-di(phen-4'-yl), diphenyl-4,4'-diyl or 2,4- or 2,6-tolylene.

Examples of suitable divalent cycloaliphatic radicals are substituted or unsubstituted, preferably unsubstituted, cycloalkanediyl radicals having from 4 to 20 carbon atoms, such as cyclobutane-1,3-diyl, cyclopentane-1,3-diyl, cyclohexane-1,3- or 1,4-diyl, cycloheptane-1,4-diyl, norbornane-1,4-diyl, adamantane-1,5-diyl, decalindiyl, 3,3,5-trimethylcyclohexane-1,5-diyl, 1-methylcyclohexane-2,6-diyl, dicyclohexylmethane-4,4'-diyl, 1,1'-dicyclohexane-4,4'-diyl or 1,4-dicyclohexylhexane-4,4''-diyl, especially 3,3,5-trimethylcyclohexane-1,5-diyl or dicyclohexylmethane-4,4'-diyl. In addition it is possible to use the corresponding triyl radicals in minor amounts.

Examples of suitable aliphatic radicals are cyclohexane-1,2-, -1,4- or -1,3-bis(methyl).

Examples of suitable substituents are those described above.

Crosslinking agents (B2) or some of the crosslinking components (B) are appropriately prepared from polyisocyanates 1.2). These may contain identical or different hardening segments. Preferably, they contain hardening segments of the same kind.

Preferably, the polyisocyanates 1.2) have an isocyanate functionality >2, more preferably >2.5, with particular preference >2.7, and in particular >2.9. The upper limit of the isocyanate functionality is preferably 10, more preferably 8, with very particular preference 6, and in particular 5.

Examples of suitable polyisocyanates 1.2) are the oligomers of diisocyanates, such as isophorone diisocyanate (i.e., 5-isocyanato-1-isocyanatomethyl-1,3,3-trimethylcyclohexane), 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-(4-isocyanatobut-1-yl)-1,3,3-trimethylcyclohexane, 1-isocyanato-2-(3-isocyanatoprop-1-yl)cyclohexane, 1-isocyanato-2-(3-isocyanatoeth-1-yl)cyclohexane, 1-isocyanato-2-(4-isocyanatobut-1-yl)cyclohexane, 1,2-diisocyanatocyclobutane, 1,3-diisocyanatocyclobutane, 1,2-diisocyanatocyclopentane, 1,3-diisocyanatocyclopentane, 1,2-diisocyanatocyclohexane, 1,3-diisocyanatocyclohexane, 1,4-diisocyanatocyclohexane, 1,2-, 1,4- or 1,3-bis(isocyanatomethyl)cyclohexane, dicyclohexylmethane 2,4'-diisocyanate or dicyclohexylmethane 4,4'-diisocyanate, especially isophorone diisocyanate.

It is preferred to use oligomers 1.2) that contain isocyanurate, urea, urethane, biuret, uretdione, iminooxadiazinedione, carbodiimide and/or allophanate groups. Examples of suitable preparation processes are known from the patents CA 2,163,591 A, U.S. Pat. No. 4,419,513 A, U.S. Pat. No. 4,454,317 A, EP 0 646 608 A, U.S. Pat. No. 4,801,675 A, EP 0 183 976 A1, DE 40 15 155 A1, EP 0 303 150 A1, EP 0 496 208 A1, EP 0 524 500 A1, EP 0 566 037 A1, U.S. Pat. No. 5,258,482 A1, U.S. Pat. No. 5,290,902 A1, EP 0 649 806 A1, DE 42 29 183 A1 and EP 0 531 820 A1 or are described in the German patent application DE 100 05 228.2, unpublished at the priority date of the present specification.

The crosslinking agents (B1) are compounds known per se and are described, for example, in the European patent application EP 0 928 800 A1, especially page 4, lines 41 to 54. Moreover, they are sold by Bayer AG under the brand name Roskydal® UA VPLS 2337.

The crosslinking agents (B2) are likewise compounds which are known per se and are prepared, for example, in accordance with the European patent application EP 0 928 800 A1, especially page 4, lines 41 to 54, except that instead of the oligomer 1.1) of hexamethylene diisocyanate used therein an oligomer 1.2) of isophorone diisocyanate is employed.

In the crosslinking components (B) for use in accordance with the invention, the weight ratio of crosslinking agent (B1) to crosslinking agent (B2) may vary widely. The weight ratio of (B1) to (B2) is guided in particular by the intended profile of properties of the three-dimensional network of the coatings that is constructed from them. For instance, the flexibilizing segments of the crosslinking agents (B1) have an influence in particular on the scratch resistance of the coatings, whereas the hardening segments of the crosslinking agents (B2) affect in particular the hardness of the coatings. Surprisingly, however, by way of the weight ratio of (B1) to (B2), it is also still possible to set a high scratch resistance and a high etch resistance.

The weight ratio (B1):(B2) is preferably from 10:1 to 1:5, more preferably from 9:1 to 1:3, with particular preference from 8:1 to 1:2, with very particular preference from 6:1 to 1:1, and in particular from 5:1 to 1:1.

Where the crosslinking components (B) are prepared by reacting one of the above-described mixtures 1.), the ratio of polyisocyanates 1.1) and 1.2) is preferably set in such a way that, arithmetically, the above-described weight ratios are also produced.

Suitable compounds 1.3) by means of which the hardening segments are introduced into the crosslinking components (B) in accordance with the third preferred embodiment are selected from the group consisting of polyols, especially diols, polyamines, especially diamines, and amino alcohols. Of these, the diamines and the diols have particular advantages and are therefore used with preference.

Diols and diamines used with preference are selected from the group consisting of cyclobutane-1,3-diol, cyclopentane-1,3-diol, cyclohexane-1,3- or -1,4-diol, cycloheptane-1,4-diol, norbornane-1,4-diol, adamantane-1,5-diol, decalindiol, 3,3,5-trimethylcyclohexane-1,5-diol, 1-methylcyclohexane-2,6-diol, dicyclohexylmethane-4,4'-diol, 1,1'-dicyclohexane-4,4'-diol or 1,4-dicyclohexylhexane-4,4"-diol, especially 3,3,5-trimethylcyclohexane-1,5-diol or dicyclohexylmethane-4,4'-diol, and also the corresponding diamines.

Suitable compounds 1.4) by means of which the flexibilizing segments are introduced into the crosslinking components (B) in accordance with the third preferred embodiment are likewise selected from the group consisting of polyols, especially diols, polyamines, especially diamines, and amino alcohols. Of these, the diamines and the diols have particular advantages and are therefore used with preference.

Diols and diamines used with preference are selected from the group consisting of
- butane-1,4-, pentane-1,5-, hexane-1,6-, heptane-1,7-, octane-1,8-, nonane-1,9-, decane-1,10-, undecane-1,11-, dodecane-1,12-, tridecane-1,13-, tetradecane-1,14-, pentadecane-1,15-, hexadecane-1,16-, heptadecane-1,17-, octadecane-1,18-, nonadecane-1,19- or eicosane-1,20-diol, and also the corresponding diamines;
- 2-heptyl-1-pentylcyclohexane-3,4-bis(nonyl-9-ol), cyclohexane-1,2-, -1,4- or -1,3-bis(methylol), cyclohexane-1,2-, -1,4- or -1,3-bis(ethyl-2-ol), cyclohexane-1,3-bis(propyl-3-ol), or cyclohexane-1,2-, -1,4- or -1,3-bis(butyl-4-ol), and also the corresponding diamines;
- diols and diamines based on divalent polyester radicals with repeating polyester fractions of the formula —(—CO—(CHR$^5$)$_m$—CH$_2$—O—)—; in this formula the index m is preferably from 4 to 6 and the substituent R$^5$ is hydrogen or an alkyl, cycloalkyl or alkoxy radical. No one substituent contains more than 12 carbon atoms, and also
- diols and diamines based on divalent linear polyether radicals, preferably having a number-average molecular weight of from 400 to 5 000, in particular from 400 to 3000; especially polyether radicals of the general formula —(—O—(CHR$^6$)$_o$—)$_p$O—, where the substituent R$^6$ is hydrogen or a lower, unsubstituted or substituted alkyl radical, the index o is from 2 to 6, preferably from 3 to 4, and the index p is from 2 to 100, preferably from 5 to 50; more especially polyether radicals which are derived from poly(oxyethylene) glycols, poly(oxypropylene) glycols, and poly(oxybutylene) glycols.

For use in aqueous coating materials of the invention, the above-described crosslinking components (B) may be hydrophilically modified in a customary and known manner, by for example incorporating ionic groups such as carboxylate groups or quaternary ammonium groups into the molecules.

The fraction of the crosslinking components (B) in the coating materials of the invention may vary very widely and is guided in particular by the number of isocyanate-reactive functional groups in the binders (A), on the one hand, and by the number of free and/or unblocked isocyanate groups in the crosslinking components (B), on the other. Preferably, the fraction of (B) is chosen so as to give an equivalents ratio of isocyanate-reactive functional groups to free and/or blocked isocyanate groups of from 2:1 to 1:2, more preferably from 1.8:1 to 1:1.8, with particular preference from 1.6:1 to 1:1.6, with very particular preference from 1.4:1 to 1:1.4, and in particular from 1.2:1 to 1:1.2. In general the amount of the crosslinking components (B) in the coating materials of the invention is preferably from 10 to 80%, more preferably from 15 to 75%, with particular preference from 20 to 70%, with very particular preference from 25 to 65%, and in particular from 30 to 60% by weight, based in each case on the solids of the coating material of the invention.

Besides the above-described essential constituents (A) and (B), the coating materials of the invention may further comprise at least one component (C) which can be activated with actinic radiation and which is different than the above-described crosslinking component (B). The component (C) may also include at least one isocyanate-reactive functional group, in particular at least one hydroxyl group.

Examples of suitable components (C) which can be activated with actinic radiation are low molecular mass reactive diluents and oligomeric or polymeric, acrylate-functional (meth)acrylic copolymers, polyether acrylates, polyester acrylates, polyesters, epoxy acrylates, urethane acrylates, amino acrylates, melamine acrylates, silicone acrylates and phosphazene acrylates, and the corresponding methacrylates, such as are known, for example, from the German patent applications DE 197 09 467 A1 or DE 198 18 735 A1 or from the German patent DE 197 09 467 C2. Particular preference is given to urethane (meth)acrylates, such as are known, for example, from the European patent application EP 0 204 161 A1; reactive diluents containing at least four acrylate groups, such as are known, for example, from the German patent application DE 198 18 735 A1, column 7, lines 1 to 25, or dipentaerythritol pentaacrylate.

Where they are used, the components (C) which can be activated with actinic radiation are present in the coating materials of the invention in an amount of from 1 to 50%, preferably from 2 to 45%, more preferably from 3 to 40%, and in particular from 4 to 35% by weight, based in each case on the solids of the coating material of the invention.

Besides the constituents described above, the coating materials of the invention may also comprise a pigment (D).

In the case of two-component and multicomponent systems, the pigments (D) may be mixed in by way of the binder component (A) and/or the crosslinking component (B). Preferably, they are mixed in by way of the binder component (A).

The pigments (D) are preferably selected from the group consisting of color and/or effect pigments, fluorescent pigments, electrically conductive pigments and magnetically shielding pigments, metal powders, organic and inorganic, transparent and opaque fillers, and nanoparticles (referred to collectively as "pigments").

Examples of suitable effect pigments (D) are metal flake pigments such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, for example, platelet-shaped effect pigments based on iron oxide with a color ranging from pink to brownish red, or liquid-crystalline effect pigments. For further details, refer to Römpp Lexikon Lacke und Druckfarben, Georg Thieme Verlag, 1998, page 176, "effect pigments" and pages 380 and 381, "metal oxide/mica pigments" to "metal pigments", and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. No. 4,828,826 A and U.S. Pat. No. 5,244,649 A.

Examples of suitable inorganic color pigments (D) are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chromium titanium yellow, cadmium sulfide, cadmium zinc sulfide, chrome yellow or bismuth vanadate.

Examples of suitable organic color pigments (D) are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, refer to Römpp Lexikon Lacke und Druckfarben, Georg Thieme Verlag, 1998, pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459, "polycyclic pigments", page 52, "azomethine pigments", "azopigments", and page 379, "metal complex pigments".

Examples of fluorescent pigments (D) (daylight-fluorescent pigments) are bis(azomethine) pigments.

Examples of suitable electrically conductive pigments (D) are titanium dioxide/tin oxide pigments.

Examples of magnetically shielding pigments (D) are pigments based on iron oxides or chromium dioxide.

Examples of suitable metal powders (D) are powders of metals and metal alloys such as aluminum, zinc, copper, bronze or brass.

Examples of suitable organic and inorganic fillers (D) are chalk, calcium sulfates, barium sulfate, silicates such as talc, mica or kaolin, silicas, oxides such as aluminum hydroxide or magnesium hydroxide, or organic fillers such as polymer powders, especially those of polyamide or polyacrylonitrile. For further details, refer to Römpp Lexikon Lacke und Druckfarben, Georg Thieme Verlag, 1998, pages 250 ff, "fillers".

Furthermore, it is of advantage to use mixtures (D) of platelet-shaped inorganic fillers such as talc or mica and non-platelet-shaped inorganic fillers such as chalk, dolomite, calcium sulfates or barium sulfate, since by this means it is possible to adjust the viscosity and rheology very effectively.

Examples of suitable transparent fillers (D) are those based on silica, alumina or zirconium oxide.

Suitable nanoparticles (D) are selected from the group consisting of hydrophilic and hydrophobic, especially hydrophilic, nanoparticles based on silica, alumina, zinc oxide, zirconium oxide, and the polyacids and heteropolyacids of transition metals, preferably of molybdenum and tungsten, having a primary particle size <50 nm, preferably from 5 to 50 nm, in particular 10 to 30 nm. With preference, the hydrophilic nanoparticles have no flatting effect. Particular preference is given to using nanoparticles based on silica.

Very particular preference is given to using hydrophilic pyrogenic silicas, whose agglomerates and aggregates have a chainlike structure and which can be prepared with the flame hydrolysis of silicon tetrachloride in an oxyhydrogen flame. They are sold, for example, by Degussa under the brand name Aerosil®. Very particular preference is also given to using precipitated waterglasses, such as nanohectorites, which are sold, for example, by Südchemie under the brand name Optigel® or by Laporte under the brand name Laponite®.

The amount of the pigments (D) in the coating materials of the invention may vary very widely. The amount is preferably set so as to give a pigment/binder ratio (D):(A) of from 1:10 to 5:1, more preferably from 1:8 to 4.5:1, with particular preference from 1:6 to 4:1, with very particular preference from 1:4 to 3.5:1, and in particular from 1:2 to 3:1.

Instead or in addition to the above-described pigments (D), the coating materials of the invention may further comprise at least one additive (E). In the case of the two-component or multicomponent systems, the additives (E) may be mixed in by way of the binder component (A) and/or the crosslinking component (B). Preferably, they are mixed in by way of the binder component (A).

Examples of suitable additives (E) are physically curable binders other than the above-described binders (A); crosslinking agents other than the above-described crosslinking components (B); molecularly dispersely soluble dyes; light stabilizers, such as UV absorbers and reversible free-radical scavengers (HALS); antioxidants; low-boiling and high-boiling ("long") organic solvents; devolatilizers; wetting agents; emulsifiers; slip additives; polymerization inhibitors; thermal crosslinking catalysts; thermolabile free-radical initiators; photoinitiators and photocoinitiators; thermally curable reactive diluents; adhesion promoters; leveling agents; film formation auxiliaries; rheological assistants (thickeners and pseudoplastic sag control agents SCAs); flame retardants; corrosion inhibitors; freeflow aids; waxes; siccatives; biocides and/or flatting agents; such as are described in detail, for example, in the text book "Lackadditive" [additives for coatings] by Johan Bieleman, Wiley-VCH, Weinheim, N.Y., 1998, or in the German patent application DE 199 14 896 A1, column 14, line 26, to column 15, line 46. For further details, refer also to DE 199 04 317 A1 and DE 198 55 125 A1.

In terms of its method, the preparation of the coating materials of the invention has no special features but instead takes place by the mixing and homogenizing of the above-described constituents with the aid of customary and known mixing techniques and apparatus such as stirred tanks, stirred mills, extruders, kneaders, Ultraturrax, inline dissolvers, static mixers, toothed ring dispersers, pressure release nozzles and/or microfluidizers, preferably in the absence of actinic radiation.

The resulting coating materials of the invention are conventional coating materials, containing organic solvents; aqueous coating materials; substantially or entirely solvent-free and water-free liquid coating materials (100% systems); substantially or entirely solvent-free and water-free solid coating materials (powder coating materials), or substantially or entirely solvent-free powder coating suspensions (powder slurries).

They are outstandingly suitable for producing single-coat and multicoat clearcoats, and also single-coat and multicoat, color and/or effect, electrically conductive, magnetically shielding and/or fluorescent coatings, in particular by the wet-on-wet technique, in which a base coat material, especially an aqueous base coat material, is applied to the surface of a substrate and then the resulting base coat film, without being cured, is dried and overcoated with a clearcoat film. Thereafter the two films are cured together.

Surprisingly, the coating materials of the invention are also suitable for use as adhesives and sealing compounds.

In terms of its method, the application of the coating materials, adhesives and sealing compounds of the invention has no special features but may take place by any customary application method, such as spraying, knife coating, brushing, flow coating, dipping, trickling or rolling, for example. In the case of the coating materials of the invention it is preferred to employ spray application methods, unless the materials in question are powder coating materials, which are applied, for example, with the aid of the fluidized bed techniques typical for powder coatings. In general it is advisable to operate in the absence of actinic radiation in order to prevent premature crosslinking of the coating materials, adhesives, and sealing compounds of the invention.

Suitable substrates are all those whose surface is undamaged by the use of heat and actinic radiation in connection with the curing of the films that are present thereon. The substrates preferably comprise metals, plastics, wood, ceramic, stone, textile, fiber composites, leather, glass, glass fibers, glass wool and rock wool, mineral- and resin-bound building materials, such as plasterboard and cement slabs or roof tiles, and also composites of these materials.

Accordingly, the coating materials, adhesives, and sealing compounds of the invention are outstandingly suitable for the coating, adhesive bonding, and sealing of motor vehicle bodies, parts of motor vehicle bodies, the interior and exterior of motor vehicles, buildings inside and out, doors, windows, and furniture, and for coating, adhesive bonding, and sealing in the context of the industrial coating of, for example, small parts, such as nuts, bolts, wheel rims or hubcaps, of coils, containers, packaging, electrical components, such as motor windings or transformer windings, and of white goods, such as domestic appliances, boilers, and radiators.

In the case of electrically conductive substrates it is possible to use primers produced conventionally from electrocoat materials. Both anodic and cathodic electrocoat materials are suitable for this purpose, but especially cathodic electrocoat materials. Unfunctionalized and/or nonpolar plastics surfaces may be subjected before coating in a known manner to a pretreatment, such as with a plasma or by flaming, or may be provided with a water-based primer.

The curing of the applied dual-cure mixtures of the invention also has no special features in terms of its method but instead takes place in accordance with the customary and known thermal methods, such as heating in a forced air oven or irradiation using IR lamps. For curing with actinic radiation, suitable radiation sources are those such as high-pressure or low-pressure mercury vapor lamps with or without lead doping in order to open up a radiation window of up to 405 nm, or electron beam sources. Further examples of suitable techniques and equipment for curing with actinic radiation are described in the German patent application DE 198 18 735 A1, column 10, lines 31 to 61.

The resultant coatings of the invention, especially the single-coat or multicoat color and/or effect paint systems and clearcoats of the invention, are easy to produce and have outstanding optical properties and very high light stability, chemical resistance, water resistance, condensation resistance, weathering stability, and etch resistance. In particular, they are free from clouding and inhomogeneities. They have very good reflow properties and outstanding scratch resistance.

The adhesive films of the invention bond a very wide variety of substrates durably and firmly to one another and possess high chemical and mechanical stability even under conditions of extreme temperatures and/or temperature fluctuations.

Similarly, the seals of the invention provide long-term sealing of the substrates, and possess high chemical and mechanical stability even under conditions of extreme temperatures and/or temperature fluctuations and even in conjunction with exposure to aggressive chemicals.

In particular, however, the coatings of the invention possess high hardness, etch resistance, and scratch resistance, and so may be used to a particular advantage in the field of automotive finishes.

A further advantage of the coating materials, adhesives and sealing compounds of the invention is that even in the shadow zones of three-dimensional substrates of complex shape, such as vehicle bodies, radiators or electrical wound products, and even without optimum illumination, in particular complete illumination, of the shadow zones with actinic radiation, they provide coatings, adhesive films, and seals whose profile of performance properties is at least equal to that of the coatings, adhesive films, and seals outside of the shadow zones. As a result, the coatings, adhesive films, and seals located in the shadow zones are no longer easily damaged by mechanical and/or chemical attack, such as may occur, for example, when further components of motor vehicles are installed in the coated bodies.

Accordingly, the primed or unprimed substrates which are conventionally employed in the technological fields set out above and which are coated with at least one coating of the invention, adhesively bonded with at least one adhesive film of the invention, and/or sealed with at least one seal of the invention combine a particularly advantageous profile of performance properties with a particularly long service life, so making them particularly attractive from an economic and environmental standpoint.

EXAMPLES

Preparation Example 1

The Preparation of a Methacrylate Copolymer (A)

An appropriate reactor equipped with a stirrer, two dropping funnels for the monomer mixture and the initiator solution, a nitrogen inlet pipe, thermometer, heating and a reflux condenser was charged with 650 parts by weight of an aromatic hydrocarbon fraction having a boiling range from 158 to 172° C. The solvent was heated to 140° C. Thereafter a monomer mixture of 652 parts by weight of ethylhexyl acrylate, 383 parts by weight of 2-hydroxyethyl methacrylate, 143 parts by weight of styrene, 212 parts by weight of 4-hydroxybutyl acrylate and 21 parts by weight of acrylic acid was metered into the initial charge at a uniform rate over the course of four hours and an initiator solution of 113 parts by weight of the aromatic solvent and 113 parts by weight of tert-butyl perethylhexanoate was metered into the initial charge at a uniform rate over the course of 4.5 hours. The additions of the monomer mixture and of the initiator solution were commenced simultaneously. After the end of the initiator feed, the resulting reaction mixture was heated at 140° C. with stirring for two hours more and then cooled. The resulting solution of the methacrylate copolymer (A) was diluted with a mixture of 1-methoxypropyl 2-acetate, butyl glycol acetate and butyl acetate. The resulting solution had a solids content of 65% by weight, determined in a forced air oven (one hour/130° C.), and an acid number of 15 mg KOH/g solids.

Example 1

The Preparation of an Inventive Clearcoat Material

The inventive clearcoat material was prepared by mixing the constituents indicated in the table, in the sequence stated, and homogenizing the resulting mixture.

TABLE

The material composition of the inventive clearcoat material

| Constituent | Parts by weight |
|---|---|
| Stock varnish: | |
| Methacrylate copolymer from preparation example 1 | 35.9 |
| Dipentaerythritol pentaacrylate | 20 |
| UV absorber (substituted hydroxyphenyltriazine) | 1.0 |
| HALS (N-methyl-2,2,6,6-tetramethylpiperidinyl ester) | 1.0 |
| Wetting agent (Byk ® 306 from Byk Chemie) | 0.4 |
| Butyl acetate | 27.4 |
| Solventnaphtha ® | 10.8 |
| Irgacure ® 184 (commercial photoinitiator from Ciba Specialty Chemicals) | 2.0 |
| Genocure ® MBF (commercial photoinitiator from Rahn) | 1.0 |
| Lucirin ® TPO (commercial photoinitiator from BASF AG) | 0.5 |
| Total: | 100 |
| Crosslinking component (B): | |
| Total: | 38.28 |
| Crosslinking agent (B1): | |
| Isocyanatoacrylate Roskydal ® UA VPLS 2337 from Bayer AG (Basis: Trimeric hexamethylene diisocyanate; isocyanate group content: 12% by weight) | 27.84 |
| Crosslinking agent (B2): | |
| Isocyanatoacrylate based on the trimer of isophorone diisocyanate (70.5% strength in butyl acetate; viscosity: 1 500 mPas; isocyanate group content: 6.7% by weight; prepared in accordance with example 1 of EP 0 928 800 A1) | 6.96 |
| Diluent | 3.48 |

The inventive clearcoat had a very good pot life and very good application properties.

Example 2

The Production of an Inventive Color-Imparting Multicoat Paint System

To produce the multicoat paint system of the invention, steel panels were coated in succession with a cathodically deposited electrodeposition coating, which was baked at 170° C. for 20 minutes and had a dry coat thickness of from 18 to 22 μm. Thereafter the steel panels were coated with a commercially customary two-component waterborne primer-surfacer from BASF Coatings AG, such as is commonly used for plastics substrates.

The resulting primer-surfacer film was baked at 90° C. for 30 minutes so as to give a dry coat thickness of from 35 to 40 μm. Thereafter a commercially customary aqueous black base coat material from BASF Coatings AG was applied with a film thickness of from 12 to 15 μm, after which the resulting aqueous base coat films were flashed off at 80° C. for 10 minutes. Subsequently, the inventive clearcoat from example 1 was applied pneumatically in one cross-pass using a cup-type gun in a film thickness of from 40 to 45 μm. The aqueous base coat films and the clearcoat films were cured at room temperature for 5 minutes, at 80° C. for 10 minutes, followed by exposure to UV light with a dose of 1 500 mJ/cm², and finally at 140° C. for 20 minutes.

The multicoat paint system of the invention had an outstanding profile of performance properties.

The multicoat paint system was very bright and had a gloss (20°) to DIN 67530 of 90.5. The micropenetration hardness (universal hardness at 25.6 mN, Fischerscope 100V with Vickers diamond pyramid) was 138.1.

The scratch resistance was determined by means of a sand test (cf. the German patent application DE 138 39 453 A1, page 9, lines 1 to 63) on the basis of the metal test panels described above. After damage, a loss of gloss by only ten units (20°) to 80.5 was found, which underscored the high scratch resistance.

Moreover, the scratch resistance was assessed with the aid of the brush test (cf. the German patent application DE 198 39 453 A1, page 9, lines 17 to 63) on the basis of the metal test panels described above. After damage, a loss of gloss by only four units (20°) to 86.5 was found, which underscored the high scratch resistance.

With the MB gradient oven test, which is known to those skilled in the art, the first signs of damage to the clearcoat by sulfuric acid occurred only above a temperature of 53° C., and damage by tree resin only above a temperature of 55° Celsius. The etch resistance was also outstanding.

What is claimed is:

1. A coating material curable thermally and with actinic radiation, comprising
   (A) at least one binder containing isocyanate-reactive functional groups and
   (B) a crosslinking component comprising one or more constituents comprising at least one of
      (i) isocyanate groups comprising at least one of free isocyanate groups or blocked isocyanate groups,
      (ii) reactive functional groups containing at least one bond which can be activated with actinic radiation,
      (iii) flexibilizing segments which as part of three-dimensional networks lower their glass transition temperature Tg, and
      (iv) hardening segments which as part of three-dimensional networks raise their glass transition temperature Tg;
   and mixtures there,
with the proviso that the crosslinking component (B) comprises at least two constituents which both comurise (i) and (ii).

2. The coating material of claim 1, wherein the crosslinking component (B) comprises
   (B1) at least one constituent comprising on average per molecule
      (i) an isocyanate group comprising at least one of a free isocyanate group or a blocked isocyanate group,
      (ii) reactive functional group containing at least one bond which can be activated with actinic radiation, and
      (iii) flexibilizing segment which as part of three-dimensional networks lowers their glass transition temperature Tg; and
   (B2) at least one constituent containing on average per molecule
      (i) an isocyanate group comprising at least one of a free isocyanate group or a blocked isocyanate group,
      (ii) reactive functional group containing at least one bond which can be activated with actinic radiation, and
      (iii) hardening segment which as part of three-dimensional networks raises their glass transition temperature Tg.

3. The coating material of claim 1, wherein the crosslinking component (B) comprises at least one constituent prepared by a reaction between a mixture 1.) and a compound 2.)
   wherein
      mixture 1.) comprises
         1.1) at least one polyisocyanate containing on average per molecule isocyanate groups selected from the group consisting of at least two free isocyanate groups, and at least two free isocyanate groups and at least one blocked isocyanate groups, and at least one flexibilizing segment which as part of three-dimensional networks lowers their glass transition temperature Tg; and
         1.2) at least one polyisocyanate containing on average per molecule isocyanate groups selected from the group consisting of at least two free isocyanate groups, and at least two free isocyanate groups and at least one blocked isocyanate groups, and at least one hardening segment which as part of three-dimensional networks raises their glass transition temperature Tg: with
      and compound 2.) comprises on average per molecule at least one isocyanate-reactive functional group and at least one reactive functional group having at least one bond which can be activated with actinic radiation.

4. The coating material of claim 1, wherein the crosslinking component (B) comprises at least one constituent prepared by a reaction in the first stage to produce a precursor 3.) followed by reaction of precursor 3.) with a compound 2) comprising on average per molecule at least one isocyanate reactive functional group and at least one reactive functional group having at least one bond activated with actinic radiation; said reaction in the first stage being at least one of a group consisting of a reaction in the first stage of 1.1) with 1.3); a reaction in the first stage of 1.2) with 1.4); a reaction in the first stage of 1.1) with [1.3) and 1.4)]; a reaction in the first stage of 1.2) with [1.4) and 1.3)]; a reaction in the first stage of [1.1) and 1.2)] with 1.3); a reaction in the first stage of [1.1) and 1.2)] with 1.4); and a reaction in the first stage of [1.1) and 1.2)] with [1.3) and 1.4)],
   wherein
      1.1) is at least one polyisocyanate comprising on average per molecule isocyanate groups selected from at least two free isocyanate groups, and at least two free isocyanate groups and at least one blocked isocyanate group, and at least one flexibilizing segment which as part of three-dimensional networks lowers their glass transition temperature Tg:
      1.3) is at least one compound comprising at least two isocyanate-reactive functional groups and at least one hardening segment which as part of three-dimensional networks raises their glass transition temperature Tg, in the molecule,
      1.2) is at least one polyisocyanate comprising on average per molecule isocyanate groups selected from at least two free isocyanate groups, and at least two free isocyanate groups and at least one blocked isocyanate group, and at least one hardening segment which as part of three-dimensional networks raises their glass transition temperature Tg; and
      1.4) is at least one compound comprising at leat two isocyanate-reactive functional groups and at least one flexibilizing segment which as part of three-dimensional networks lowers their glass transition temperature Tg, in the molecule, and the reaction in the first stage to product precursor 3.) occurs in an equivalents ration such that the precursors 3.) comprise on average per molecule isocyanate groups selected from the group consisting of at least two free isocyanate groups, and at least two free isocyanate groups and at least one blocked isocyanate group.

5. The coating material of claim 1, wherein the binders (A) are selected from the group consisting of random alternating and block, linear, branched and comb, polyaddition resins and polycondensation resins and also addition (co)polymers of olefinically unsaturated monomers, which are curable thermally and both thermally and with actinic radiation.

6. The coating material of claim 1, wherein the isocyanate-reactive groups are at least one of the group consisting of hydroxyl, thiol, primary amino, and secondary amino groups.

7. The coating material of claim 6, wherein the isocyanate-reactive groups are hydroxyl groups.

8. The coating material of claim 1, wherein the binder (A) further comprises on average per molecule at least one reactive functional group having at least one bond which can be activated with actinic radiation.

9. The coating material of claim 1, wherein the bonds which can be activated with actinic radiation are at least one of the group consisting of carbon-hydrogen single bonds or carbon-carbon, carbon-oxygen, carbon-nitrogen, carbon-phosphorus or carbon-silicon single bonds or double bonds.

10. The coating material of claim 9, wherein the bonds, which can be activated with actinic radiation, are carbon-carbon double bonds.

11. The coating material of claim 1, wherein the flexibilizing segments are at least one of the group consisting of divalent aliphatic hydrocarbon radicals and divalent, heteroatom-containing aliphatic hydrocarbon radicals.

12. The coating material of claim 11, wherein the flexibilizing segments are hexamethylene radicals.

13. The coating material of claim 1, wherein the hardening segments are a least one of the group consisting of divalent and higher polyvalent aromatic and cycloaliphatic radicals.

14. The coating material as claimed in claim 13, wherein the cycloaliphatic radicals are isophorone radicals.

15. The use of the coating materials as claimed in any of claims 1 to 14 to produce single-coat and multicoat clearcoats, and also single-coat and multicoat, color and/or effect, electrically conductive, magnetically shielding and/or fluorescent coatings.

16. A method of making a coated substrate, comprising applying the coating material of claim 1 to a substrate to provide a coated substrate.

17. The method of claim 16, wherein the substrate is a previously clearcoated substrate and the coating material is a clearcoat.

18. The method of claim 16, wherein the substrate is a previously basecoated substrate and the coating material is a clearcoat.

19. The method of claim 16, wherein the coating material is at least one of a color coating, an effect coating, an electrically conductive coating, a magnetically shielding coating, or a fluorescent coating.

20. The method of claim 16, wherein the coating material is at least one of an adhesive or a sealing compound.

21. The method of claim 16, wherein the substrate is at least one of a motor vehicle body substrate, a motor vehicle part substrate, a motor vehicle interior substrate, a motor vehicle exterior substrate, a interior building substrate, an exterior building substrate, a door substrate, a window substrate, a furniture substrate, an industrial substrate, a coil, a container, a packaging substrate, an electrical component, and white goods.

* * * * *